United States Patent
Miller et al.

(10) Patent No.: US 9,148,398 B2
(45) Date of Patent: Sep. 29, 2015

(54) PRIORITIZED AND CONTEXTUAL DISPLAY OF AGGREGATED ACCOUNT NOTIFICATIONS

(71) Applicants: Alison Beverly Miller, San Francisco, CA (US); Samantha Lemonnier, Palo Alto, CA (US); Jaime Lynn Sonoda, Concord, CA (US); Jamie Samdal, Mountain View, CA (US); Vance Maverick, San Francisco, CA (US); Eric Hwang, San Francisco, CA (US)

(72) Inventors: Alison Beverly Miller, San Francisco, CA (US); Samantha Lemonnier, Palo Alto, CA (US); Jaime Lynn Sonoda, Concord, CA (US); Jamie Samdal, Mountain View, CA (US); Vance Maverick, San Francisco, CA (US); Eric Hwang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 13/802,426

(22) Filed: Mar. 13, 2013

(65) Prior Publication Data
US 2014/0280657 A1  Sep. 18, 2014

(51) Int. Cl.
*G06F 15/16* (2006.01)
*H04L 12/58* (2006.01)

(52) U.S. Cl.
CPC ..................... *H04L 51/26* (2013.01)

(58) Field of Classification Search
CPC ..... H04L 51/26; H04L 51/24; H04L 12/1895; H04L 29/06; H04L 51/14; H04L 12/581; H04L 12/5855; H04L 29/08072; H04L 29/08558; H04L 29/08648; H04L 29/08657; H04L 29/08684; H04L 29/08693; H04L 29/089; H04L 67/306; H04L 41/5009; H04L 43/16; H04L 43/50; H04L 63/102; G06F 17/30864
USPC ......... 715/768, 766, 802, 853, 854, 210, 764, 715/765, 767, 789, 811, 812, 821; 709/206, 709/203, 207, 219, 223, 224, 232; 702/150
See application file for complete search history.

(56) References Cited

U.S. PATENT DOCUMENTS

| | | | |
|---|---|---|---|
| 6,593,943 B1 * | 7/2003 | MacPhail | 715/734 |
| 7,120,865 B1 | 10/2006 | Horvitz et al. | |
| 2002/0036654 A1 * | 3/2002 | Evans et al. | 345/744 |
| 2002/0054117 A1 * | 5/2002 | van Dantzich et al. | 345/766 |
| 2003/0046421 A1 * | 3/2003 | Horvitz et al. | 709/238 |
| 2003/0163372 A1 * | 8/2003 | Kolsy | 705/14 |
| 2006/0075019 A1 * | 4/2006 | Donovan et al. | 709/203 |
| 2007/0011314 A1 | 1/2007 | Horvitz et al. | |
| 2007/0050191 A1 * | 3/2007 | Weider et al. | 704/275 |
| 2008/0163258 A1 | 7/2008 | Balasubramanian | |
| 2010/0151782 A1 | 6/2010 | Sato et al. | |

(Continued)

OTHER PUBLICATIONS

ISR in PCTUS2013070538 DTD Feb. 26, 2015.

*Primary Examiner* — Hitesh Patel
(74) *Attorney, Agent, or Firm* — Foley & Lardner LLP; John D. Lanza

(57) ABSTRACT

Systems and methods of providing notifications are described herein. A user account for which a request to provide content is received is identified. Responsive to identifying the user account and the content requested, one or more notifications to be provided along with the requested content is identified. Each of the notifications has a corresponding notification type identifier that indicates a type of notification. A priority level for each of the notifications is determined responsive to a global prioritization policy and the corresponding notification type identifier. The priority level for each of the notifications can be determined by identifying the notification type identifier for each notification, identifying a priority level that matches the notification type identifier and assigning the notification the identified priority level.

23 Claims, 8 Drawing Sheets

(56) References Cited

U.S. PATENT DOCUMENTS

| | | | |
|---|---|---|---|
| 2011/0320529 A1* | 12/2011 | Mentchoukov et al. | 709/203 |
| 2012/0042280 A1* | 2/2012 | Hoffman | 715/800 |
| 2012/0101952 A1* | 4/2012 | Raleigh et al. | 705/304 |
| 2012/0246325 A1* | 9/2012 | Pancorbo Marcos et al. | 709/227 |
| 2012/0296919 A1 | 11/2012 | Sinha et al. | |
| 2013/0007665 A1* | 1/2013 | Chaudhri et al. | 715/830 |
| 2013/0031190 A1 | 1/2013 | Chan et al. | |
| 2013/0055306 A1* | 2/2013 | Macrae et al. | 725/32 |
| 2014/0189030 A1* | 7/2014 | Benchenaa et al. | 709/207 |

* cited by examiner

PRIORITIZED AND CONTEXTUAL DISPLAY OF AGGREGATED ACCOUNT NOTIFICATIONS

BACKGROUND

Many different types of notifications exist in online interfaces today, including alerts for problems of varying severity, opportunities for improvement, announcements of new features, amongst others. Existing systems are unable to display these different types of notifications in a sophisticated manner resulting in notification blindness.

SUMMARY

At least one aspect is directed to a computer implemented method for prioritized and contextual display of aggregate account notifications. A user account for which a request to provide content is received is identified. Responsive to identifying the user account and the content requested, one or more notifications to be provided along with the requested content is identified. In some implementations, a first notification corresponding to the identified user account generated by a first notification generation system and a second notification corresponding to the identified user account generated by a second notification generation system are identified. Each of the notifications has a corresponding notification type identifier that indicates a type of notification. A priority level for each of the notifications is determined responsive to a global prioritization policy and the corresponding notification type identifier. In some implementations, the priority level for each of the notifications is determined by identifying the notification type identifier for each notification, identifying a priority level that matches the notification type identifier and assigning the notification the identified priority level.

One or more of the identified notifications are provided for display based on a notification display policy and the priority levels of the identified notifications. In some implementations, one or more of the identified notifications are provided for display by determining a format in which to display the identified notification based on the determined priority level and providing the identified notification for display in the determined format. In some implementations, the notifications are provided for display by determining that the number of notifications having a first priority level is greater than a predetermined threshold number of notifications to display with the requested content. From the notifications having the first priority level, the predetermined number of notifications is selected according to a selection policy. The selected predetermined number of notifications is then provided for display with the requested content. An object is also provided, which when accessed, provides the remaining notifications having the first priority. In some implementations, notifications having a first priority level for display are provided for display at a first location of the display. In some implementations, an indication of notifications having a second priority level are provided for display at a second location of the display.

At least one aspect is directed to a system of prioritized and contextual display of aggregate account notifications. The data processing system includes a notification identification module, a notification prioritization module and a notification presentation module. The data processing system is configured to identify a user account for which a request to provide content is received and identify one or more notifications to be provided along with the requested content. Each of the notifications has a corresponding notification type identifier indicating a type of notification. The data processing system can also determine a priority level for each of the notifications responsive to a global prioritization policy and the corresponding notification type identifier. In some implementations, the global prioritization policy is customized by the user according to one or more preferences of the user. The data processing system can provide one or more of the identified notifications for display based on a notification display policy and the priority levels of the identified notifications. In some implementations, notifications having a first priority level are displayed in a first notification slot positioned at a first location of the display and notifications having a second priority level are displayed in a second notification slot positioned at a second location of the display.

At least one aspect is directed to a computer readable storage medium having instructions to provide notifications for display. The instructions include instructions to identify a user account for which a request to provide content is received and identify one or more notifications to be provided along with the requested content. Each of the notifications has a corresponding notification type identifier indicating a type of notification. A priority level for each of the notifications is determined responsive to a global prioritization policy and the corresponding notification type identifier. One or more of the identified notifications is provided for display based on a notification display policy and the priority levels of the identified notifications.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
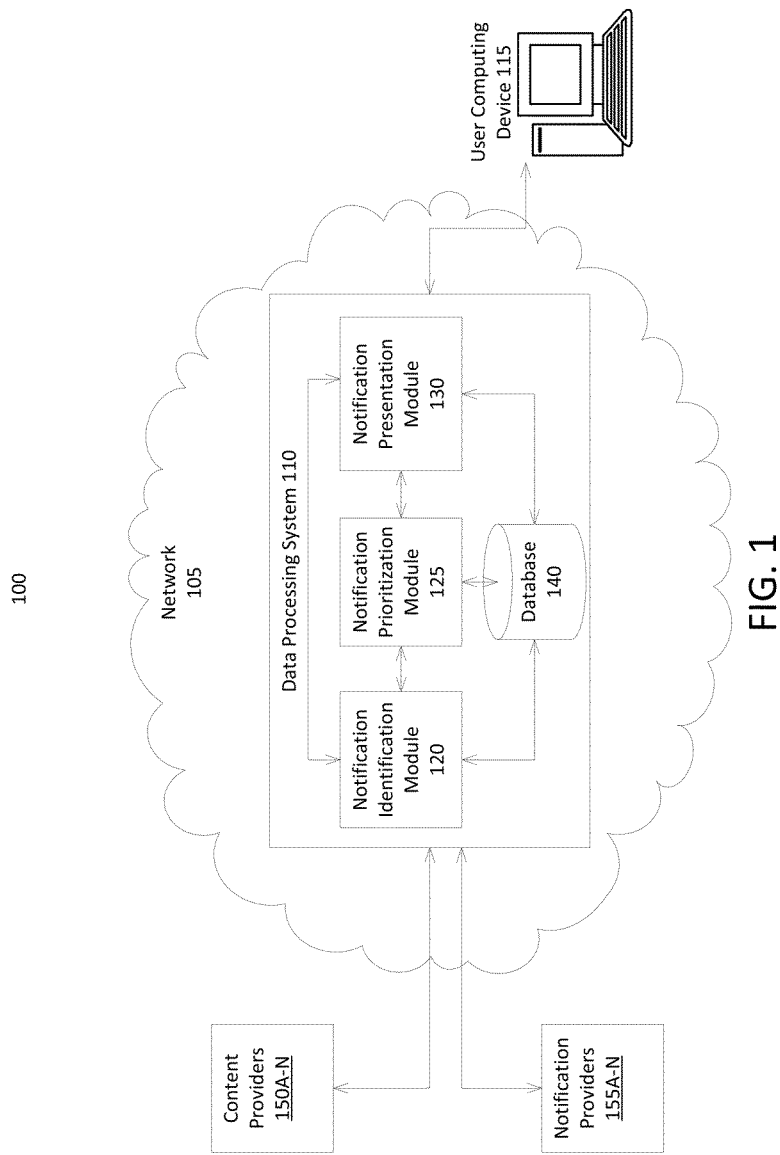
FIG. 1 is a block diagram depicting an example environment for prioritized and contextual display of aggregate account notifications, according to an illustrative implementation.

Following below are more detailed descriptions of various concepts related to, and implementations of, methods, apparatuses, and systems for prioritized and contextual display of aggregated account notifications. The various concepts introduced above and discussed in greater detail below may be implemented in any of numerous ways, as the described concepts are not limited to any particular manner of implementation. Examples of specific implementations and applications are provided primarily for illustrative purposes.

As described above, many different types of notifications exist in online interfaces today, including alerts for problems of varying severity, opportunities for improvement, announcements of new features, amongst others. As an example, a product, such as Google AdWords, can generate numerous types of notifications that may be specific to a particular user account or generic to more than one user account. For example, a notification can be generated indicating that the credit card associated with the user account is expired. This notification can be generated by a billing division associated with Google AdWords and is specific to the user account. Another example of a notification can indicate a suggestion to increase the budget amount for a particular ad campaign to increase the number of clicks and sales. This notification can be generated by a sales division and also is specific to the user account. Yet another example of a notification can indicate that a new feature has been released. This notification can be generated by a technology division associated with Google AdWords. In addition, this notification can be generic to more than one user account. These notifications are oftentimes displayed in the same area of the user interface where the primary content is intended to be displayed leading to a cluttered user interface.

As these notifications often are generated from different systems and displayed in different areas of the user interface, the notifications can lead to an inconsistent experience and a constant influx of information for the user. This can increase the potential for notification blindness. Furthermore, since there is no connection between any of the notifications, the user interface treats all of the notifications with equal importance. As such, important notifications are displayed with other notifications that are less important in no particular order. Moreover, the notifications are often not even relevant to the primary content with which they are displayed. As such, important or contextually relevant notifications that can benefit the user or the product fail to reach the user, reducing the overall performance of the product.

The present disclosure relates to systems and methods for prioritized and contextual display of aggregate account notifications. In particular, the systems and methods described herein can provide an improved user interface for displaying aggregated, contextual notifications that allows for prioritization across different types of notifications and scales to allow users to view many notifications without impinging on the area of the user interface designated to display the primary content. In particular, the systems and methods can be configured to aggregate notifications from various notification providers, select notifications that are contextually relevant to the primary content with which the notifications are being displayed and determine a priority of the selected notifications such that the notifications can be provided for display in a manner that reduces the possibility of notification blindness. In some implementations, the notifications are provided for display on a user interface according to a notification priority policy and a notification display policy.

In some implementations, a data processing system receives a request to provide primary content. In some implementations, the request includes a request to provide primary content associated with a user account. The data processing system identifies a user account for which the request to provide primary content is received.

Upon identifying the user account, the data processing system can identify one or more notifications to be provided for display along with the requested content. In some implementations, the data processing system can receive notifications from one or more notification providers. In some such implementations, the data processing system can request notifications from the notification providers. The data processing system can provide the notification providers the identity of the user account requesting the primary content as well as the context of the primary content requested. In this way, the notification providers can provide notifications that are relevant to the user account or contextually relevant to the requested primary content with which the notifications are to be displayed. In some implementations, the notification providers can provide notifications to the data processing system as notifications are generated. These notifications can be stored in a database of the data processing system such that the data processing system can identify notification to be provided for display with the primary content without having to request the notification providers for notifications.

In some implementations, the data processing system identifies the notifications that are contextually related to the primary content requested. In one example, the user account is associated with a product, such as Google AdWords, and the user account is associated with multiple ad campaigns. In this example, the user associated with the user account can request primary content specific to a particular ad campaign associated with the user account.

For instance, following the example provided above, the data processing system can identify notifications generated in response to identifying an issue or opportunity associated with that particular ad campaign and not identify notifications associated with other ad campaigns associated with the user account. In some implementations, the data processing system can also identify other notifications that may not be contextually relevant to the primary content with which they will be displayed but are important to the user, for example, critical billing notifications.

The data processing system can identify notifications that are contextually relevant to the primary content by evaluating the notifications. In some implementations, the notifications can include or be associated with one or more identifiers. For example, the notification object can include one or more entity identifiers that identify the entities with which the notification is associated. For instance, a notification that is generated to notify the user of an issue with a particular ad that is part of a first ad campaign, can be associated with a primary entity identifier that identifies the particular ad, and a supplemental identifier that identifies the first ad campaign. In addition, the notification can be associated with a notification type identifier that identifies the type of notification. The notification can be associated with one or more other identifiers that can provide more information to the data processing system about the notification, such as why it was generated, which notification generation system or notification provider generated the notification, when it was generated, amongst others. The one or more identifiers can form a single identifier that can be associated with the notification.

The data processing system can evaluate the one or more identifiers of the notification to determine if the notification is contextually relevant to the primary content with which it will be displayed or if the notification is important to the user that it should also be displayed. The data processing system can make this determination according to a notification identification policy that includes one or more rules specifying whether to identify a notification for display with primary content based on the context of the primary content or based on its importance to the user. Specifically, in some implementations, the data processing system can create a filter based on the context of the primary content and the identity of the user account. The data processing system can then apply the filter to the notifications available for display.

Upon identifying the notifications to be provided for display, the data processing system determines a priority level for each of the notifications identified for display. The priority level is determined based on a global prioritization policy. In some implementations, the global prioritization policy can be applied to assign a priority level to any notification identified to be provided for display. In some implementations, the global prioritization policy includes one or more rules specifying a priority level for each notification based on the one or more notification identifiers associated with the notification. In some implementations, after the data processing system identifies the notification identifiers of a notification, the data processing system identifies a priority level that matches the notification type identifier of the notification according to the global prioritization policy. The data processing system then assigns the notification the identified priority level. In some implementations, the global prioritization policy includes a list of notification identifiers that includes notification identifiers that can be associated with any notification that can possibly be generated by any of the notification generation systems or notification providers.

The data processing system then provides one or more of the identified notifications for display based on a notification display policy and the priority levels of the identified notifications. In some implementations, the data processing system determines a format in which to display the identified notification based on the determined priority level of the notification and then provides the identified notification for display in the determined format. For example, notifications that have a high priority level at or above a threshold priority level can be displayed at the top of the user interface. In some implementations, such notifications can be displayed in the color red. Notifications that have a priority level below the threshold priority level are not directly displayed on the user interface but rather an object indicating that lower priority level notifications can be viewed is displayed on the user interface. The user can then view the lower priority level notifications upon accessing the object. In this way, the number of notifications displayed on the user interface is limited. This reduces the potential for notification blindness.

In some implementations, the data processing system determines that the number of notifications having a first priority level is greater than a predetermined threshold number of notifications to display with the requested content. The data processing system then selects the predetermined number of notifications from the notifications having the first priority level according to a selection policy. In some implementations, the selection policy is based on freshness such that the most recent notifications are displayed on the user interface. The data processing system then provides the selected predetermined number of notifications for display with the requested content and also provides an object, which when accessed, provides the remaining notifications having the first priority for display.

FIG. 1 illustrates an example system 100 for prioritized and contextual display of aggregated account notifications. In particular, the system 100 can provide notifications for display to a user computing device 110 via a network 105. The network 105 can include computer networks such as the Internet, local, metro, or wide area networks, intranets, satellite networks and other communication networks such as voice or data mobile phone networks. The system 100 includes at least one data processing system 110. The data processing system 110 can include at least one processor or other logic device such as a computing device having a processor to communicate via the network 105 with at least one user computing device 115, at least one content provider 150 and at least one notification provider 155. In some implementations, the user computing device 115, the content provider 150, the notification provider 155 and the data processing system 110 can communicate with one another via the network 105.

The data processing system 110 can include at least one server. In some implementations, the data processing system 110 includes at least one server of a pay per click (PPC) program, an advertisement auction program, or any other program in which multiple notifications are generated. The data processing system 110 includes a prioritized and contextual notification display system configured to identify notifications generated from a plurality of different notification generation systems to be provided for display with primary content according to a notification identification policy. The notification identification policy includes one or more rules specifying how to identify notifications to be provided for display based on the context of the primary content or based on the level of importance of the notification to the user. The prioritized and contextual notification display system is further configured to prioritize the notifications according to a global prioritization policy. The global prioritization policy includes one or more rules that assign a priority level to such notifications. The prioritized and contextual notification display system is also configured to display the notifications on a user interface at the user computing device 115 according to a notification display policy. The notification display policy includes one or more rules that specify a format in which to display the notifications based in part on the number and priority levels of the notifications to be displayed.

The data processing system 110 can also include at least one notification identification module 120, at least one notification prioritization module 125, at least one notification presentation module 130 and at least one database 140. The notification identification module 120, the notification prioritization module 125 and the notification presentation module 130 can each include at least one processing unit or other logic device such as programmable logic arrays configured to communicate with the database 140. The notification identification module 120, the notification prioritization module 125 and the notification presentation module 130 can be separate components, a single component, or part of the data processing system 110. Additional details relating to each of the notification identification module 120, the notification prioritization module 125, the notification presentation module 130 and the database 140 are provided below.

The user computing device 115 can be associated with a user. In some implementations, the user can communicate with the data processing system 110 via a user account identifying the user. In some implementations, the user computing device 115 includes a laptop, desktop, tablet, personal digital assistant, smart phone, or portable computer. A user can request content from the data processing system 110 via the user computing device 115. In some implementations, the data processing system can provide a user interface to the user computing device 115 through which the user can request content. In some implementations, the user may request the content by clicking on a link in the user interface, by entering a URL, amongst others.

Figure 2A:
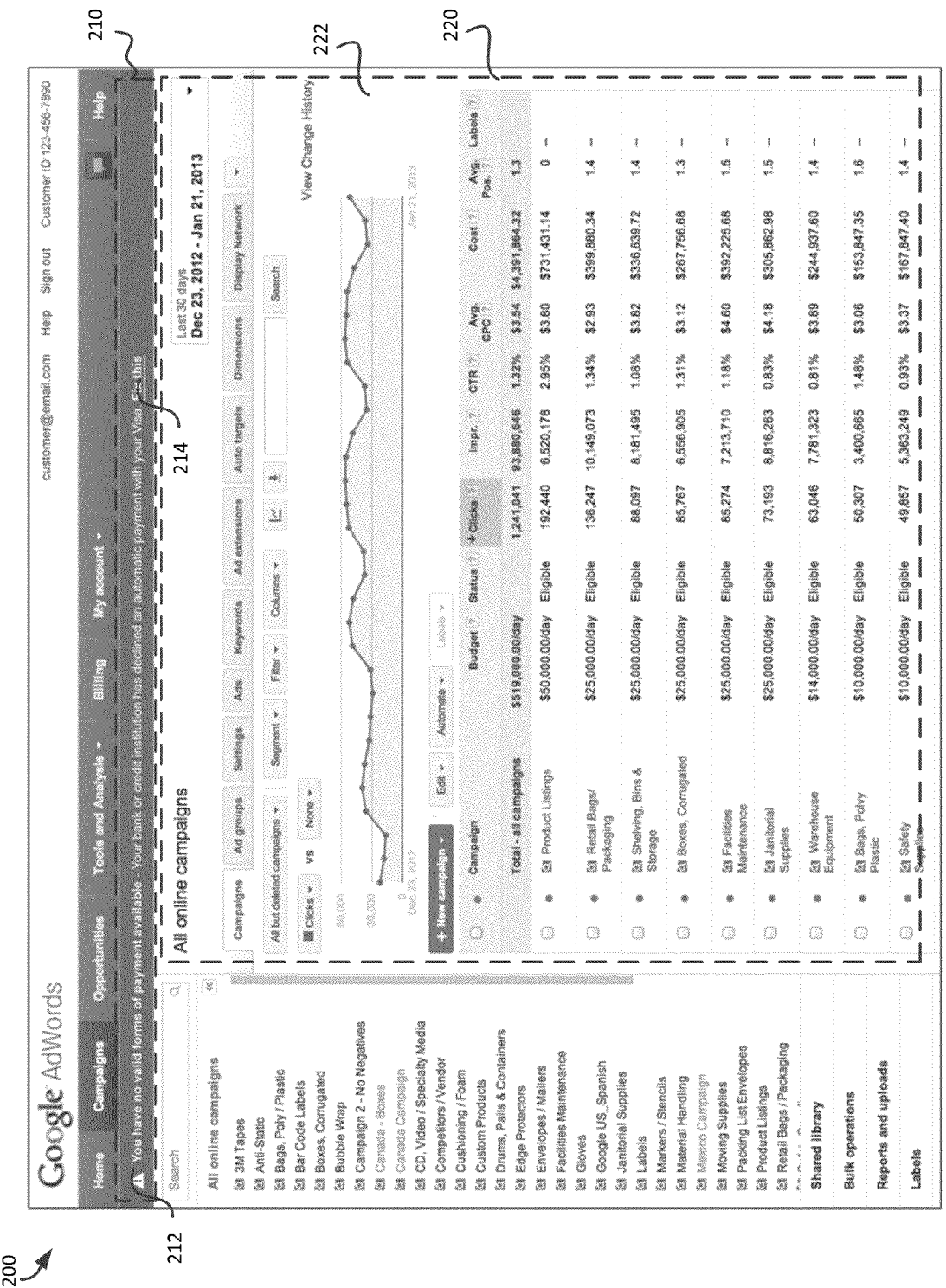
FIGS. 2A-2E are example screenshots illustrating notifications provided on a user interface according to an illustrative implementation.

The data processing system can be configured to receive the request for primary content from the user computing device 115. The request can include an identifier identifying a user account associated with the request for primary content. Examples of the identifier identifying the user account can include a cookie or other tracking object, a user account identifier, amongst others. The data processing system 110, in response to receiving the request for content, can identify the user account associated with the request based on the identifier identifying the user account. The data processing system 110 can further identify the content requested by the user account. In some implementations, the data processing system 110 can further identify the context of the content requested by the user account by evaluating the request for primary content. In some implementations, the data processing system can identify the context of the primary content requested by identifying a content identifier, such as a URL, associated with the request. In some implementations, the data processing system can identify the context by identifying a tab or link through which the content was requested by the user. For example, if the user clicks on a "Campaigns" tab as shown in FIG. 2A (which will be described in further detail below), the data processing system can identify that the context of the primary content is related to campaigns. Further, because the data processing system can also identify the user account associated with the request, the data processing system can identify that the context of the primary content is related to campaigns of the identified user account.

In some implementations, the data processing system 110 can forward the request for content to the content provider 150 via the network 105. In some implementations, the data processing system 110 can generate and provide a request for primary content corresponding to the received request to the content provider 150 responsive to receiving the request for primary content from the user computing device 115. In some implementations, the data processing system 110 can provide to the content provider 150, the identity of the user account requesting the content along with the request for the primary content requested by the user.

In some implementations, the data processing system 110 can also send a request to the one or more notification providers 155 to provide notifications to the user account to be displayed with the primary content requested from the content provider 150. In some implementations, the notification providers 155 can provide one or more notifications to the data processing system 110 responsive to receiving the request to provide notifications. The request to provide notifications can identify the user account associated with the user associated with the request for primary content from the data processing system. In some implementations, the request can also include an object that identifies the content being requested or the context of the content being requested.

In some implementations, the notification providers 155 can be configured to generate notifications. In some such implementations, the notification providers can include notification generation systems. The notification providers 155 can be configured to identify issues or opportunities for which notifications are to be generated. In some implementations, one or more of the notification providers 155 can be configured to execute a notification generation policy to identify issues or opportunities for which notifications are to be generated. A notification generation policy includes one or more rules that identify types of issues or opportunities for which notifications are generated.

In some implementations, the notification providers 155 can be assigned to generate notifications corresponding to entities of the program. For example, in a PPC program, such as Google AdWords, examples of an entity can include an ad, an ad campaign including one or more ads, a user account advertising entity including one or more ad campaigns, a billing entity, a product features entity, a sales and marketing entity, amongst others. In general, an entity can be any software construct for which an issue or opportunity can be identified, and a notification corresponding to the same can be generated. For example, a notification provider 155 can identify an issue with an ad if the ad is not being displayed since the ad contains objectionable material or a notification provider 155 can identify an opportunity if an ad is not being displayed because its bid price is lower than competing bids. Opportunities can be opportunities that improve the user's performance or improves the performance of the product, for example, improves the quality of ads being generated or displayed, or improves sales or revenue of the product, amongst others.

In some implementations, each of the entities can have an associated entity identifier. This entity identifier can be included in or with the notifications being provided to the data processing system 110. The entity identifier can be provided to the data processing system 110 to help determine if the notification is contextually relevant to the primary content with which it will be provided for display or if the notification is important enough to the user. After all, to reduce the possibility of notification blindness, the data processing system selects notifications for display that are contextually relevant to the content requested by the user account or are important enough to the user such that the user is likely to address the issue or opportunity associated with the notification.

In some implementations, the notification provider 155 can generate a notification object that includes a notification and an entity identifier identifying the primary entity for which the notification was generated. In addition, the notification object can also include one or more supplemental entity identifiers that may also have identified the issue or opportunity for which the notification is generated. For example, if a first ad of a first ad campaign has a bid price that is too low to be displayed, the notification provider 155 can generate a notification object that includes the notification and the entity identifier of the first ad and the entity identifier of the first ad campaign. In addition, the notification object can include an entity identifier associated with the user account's ad campaigns of which the first ad campaign is a part. In this way, if the data processing system 110 is identifying notifications to be displayed with primary content related to any of the first ad, the first ad campaign or the user account's ad campaigns, the data processing system 110 is able to select this notification to provide for display along with the primary content. In an example in which more than one of the ads in the first ad campaign experience an issue that causes a notification to be generated, separate notification objects can be generated for each of the ads. Each of the notification objects will include the ad's entity identifier as the primary entity identifier and include the first ad campaign as a supplemental or secondary entity identifier. In such implementations, the notification provider 155 assigned to generate notifications corresponding to the first ad campaign also generates a notification indicating that more than one of the ads is experiencing an issue. This notification will include the entity identifier associated with the first ad campaign as the primary entity identifier and include the entity identifiers associated with the ads experiencing issues as supplemental entity identifiers.

In some implementations, the notification provider 155 can further include another identifier that identifies the cause of the issue or opportunity for which the notification is generated. This can provide insight to the importance of a particular notification. In some implementations, the notification providers 155 may also provide yet another identifier that identifies a level of importance. In some implementations, the notification generation policy described above can also include one or more rules specifying the level of importance of a notification based on the issue or opportunity for which the notification was generated in the first place. As described herein, the one or more identifiers that are associated with a notification may separately or together be referred to as notification type identifiers.

Upon the notification providers 155 generating the notifications, the notification providers 155 can provide the generated notifications to the data processing system 110. In some implementations, the notifications are provided to the data processing system 110 via the network 105. The data processing system 110 can aggregate all of the notifications provided from the different notification providers. In some implementations, each of the notifications have the same format and may include the same types of information. In other implementations, the notification providers may generate the notification differently. In some such implementations, the notification processing system 110 can be configured to format the various types of notifications into one or more standardized formats. In some implementations, the data processing system 110 can store the notifications in the database 140. The database 140 can include one or more storage devices that are configured to store the notifications provided by the database 140. In some implementations, the data processing system 110 can receive the notifications in response to sending a request for notifications to the notification providers 155. In some other implementations, the data processing system 110 can receive notifications from the notification providers 155 even without sending a request for notifications.

The data processing system 110 can identify one or more notifications to be provided along with the requested content. In some implementations, the notification identification module 120 of the data processing system 110 can identify notifications that are either contextually relevant to the content requested or important enough to the user requesting the content. For example, if the content requested relates to a particular ad campaign, the notification identification module 120 can identify notifications that are associated with the particular ad campaign. In such an example, the notification identification module 120 can choose to forego identifying notifications related to other ad campaigns that are unrelated to the particular ad campaign. As a result, notifications that are contextually relevant to the primary content are selected for display with the primary content. Furthermore, if a notification relates to an expiring credit card, which if not updated, will prevent ads from being provided upon expiry, such a notification may not be contextually relevant to the particular ad campaign. However, this notification is important enough to the user as it will stop the user from being able to provide ads. As such, such a notification can also be identified to be provided for display.

In some implementations, the notification identification module 120 can identify one or more notifications according to a notification identification policy that includes one or more rules specifying how to identify notifications to be provided for display based on the context of the primary content or based on the level of importance of the notification to the user. As described above, the notifications can be associated with entity identifiers. In some implementations, the notification identification policy can specify which entity identifiers are to be displayed with the primary content based on the context of the primary content. In some implementations, the notification identification policy can include a configuration file or other software construct, such as one or more rules that specify one or more notification types that are to be displayed with a particular type of context. For example, the policy can specify that notifications having a primary entity identifier associated with an ad campaign can be displayed with a context corresponding to an ad campaign view, while notifications having a primary entity identifier associated with a keyword of an ad group can be displayed with a context corresponding to the particular ad group. In this way, notifications corresponding to an ad campaign are shown when the user interface displays a context related to the ad campaign and notifications corresponding to specific keywords of an ad group are shown when the user interface displays a context related to the ad group.

In some implementations, the contexts can correspond to links on the user interface such that when a user account requests primary content by accessing a link, the data processing system can identify the context of the primary content being requested. In some implementations, the context can further specify a user account associated with the link. In some implementations, the link itself will identify the user account. The data processing system 110 can map each link on a user interface and therefore determine the context of any request for primary context.

The notification identification policy also specifies notifications that may not be associated with the context of the primary content but are important or relevant to the user requesting the primary content or the product associated with the user account. In some implementations, the notification identification policy can identify notifications that have an identifier indicating a level of importance that exceeds a threshold level of importance. This determination is made by the notification provider generating the notification.

In some implementations, the notification provider 155 can determine the level of importance of a notification according to a notification generation policy. In some other implementations, the notification identification policy can include one or more rules to determine a level of importance of a notification. The notification identification module can determine a level of importance of a notification by determining the entity which generated the notification, by determining the cause of the issue or opportunity that triggered the generation of the notification, amongst others. The notification identification module can make these determinations based on information provided by the notification providers generating the notifications. In some implementations, the notifications may include or be associated with one or more identifiers that identify the type of notifications, including identifying the entity which generated the notification or identifying the cause of the issue or opportunity that triggered the generation of the notification.

In some implementations, the notification identification module 120 can determine a level of importance of a notification based on evaluating the contents of the notification without the use of identifiers. In some such implementations, the notification identification module 120 can semantically interpret the notification to determine the type of notification and then determine whether such a type of notification is important enough to be provided for display with the primary content. The notification identification module 120 can determine if the notification is contextually relevant to the primary content by also semantically interpreting the notification. For example, the notification identification module 120 can perform a keyword match to see if the notification includes any key words that match the requested content. For example, if the content requested related to a particular ad campaign dealing with the term "Automobile", the notification identification module 120 can be configured to evaluate the notification for the term "Automobile". The notification identification module 120 can also apply other known techniques to determine the contextual relevance between the notification and the requested content.

In some implementations, the data processing system 110 can identify if a notification has previously been provided for display to the user account. The data processing system 110 can mark a notification as displayed once it has been provided for display. Such notifications may be prevented from being displayed again. In some implementations, notifications may be displayed more than once based on their level of importance or contextual relevance or based on how the user responded to the notification previously. In some implementations, the data processing system 110 is tracking the notifications that have been provided for display. If the user has previously viewed a notification, the notification can be marked as viewed. If the user has previously taken an action that resolves the issue that generated the notification in the first place, the data processing system can remove the notification or mark the notification as resolved. If the user has previously dismissed a notification, the notification can be marked as dismissed. The data processing system 110 can be configured to treat notifications that have been addressed, i.e., viewed, resolved, or dismissed, differently. For example, the data processing system 1110 can be configured to not identify previously addressed notifications to be provided for display. In some implementations, the notification identification policy can specify how such notifications are to be treated or handled.

Once the data processing system 110 identifies the notifications to be displayed with the requested content, the notification prioritization module 125 of the data processing system 110 determines the priority level of each of the identified notifications. The priority level of a notification determines its level of importance to the user relative to other notifications. The notification prioritization module 125 can determine the priority level based on a global prioritization policy. The global prioritization policy includes one or more rules that can assign a notification a particular priority level. In some implementations, the global prioritization policy includes a list of notification types and their corresponding priority levels. In one example the global prioritization policy can have 5 priority levels, with level 5 being the highest and level 1 being the lowest or vice versa. In some other examples, the global prioritization policy can have a much greater number of priority levels affording the data processing system more granularity in assigning priority levels to the various types of notifications. Using the PPC program as an example, notifications that notify the user of issues that prevent the user's account from serving ads can be assigned the highest priority level, while notifications notifying the user of issues that can improve the user's ad campaign performances can be given a priority level higher than a notification notifying the user of a new product feature allowing the user to analyze their bidding strategy. In some implementations, priority levels may be assigned based on the performance and revenue impact to the product as well. For example, a notification providing a suggestion to improve account performance can have a high priority level as well as a notification indicating that an ad is not being served because the ad does not meet one of the policies for serving ads.

In some implementations, the notification prioritization module 125 can determine the priority level of a notification by identifying the type of notification. In some implementations, the type of notification can be determined by one or more notification type identifiers associated with the notification. Upon identifying the notification type identifiers of the notification, the notification prioritization module 125 applies the global prioritization policy to identify a priority level that corresponds to the notification type identifiers. Upon identifying a priority level that matches the notification type identifier, the notification prioritization module 125 assigns the notification the identified priority level. In some implementations, the global prioritization policy includes one or more rules that specify how to assign a priority level to all types of notifications. Each of the types of notifications has a corresponding priority level. In some implementations, the priority levels of each of the types of notifications is pre-assigned.

In some implementations, the global prioritization policy is configured to include one or more rules that assign a priority level to each type of notification that can be generated by each of the notification providers 155. The global prioritization policy can be updated to include new notification types as notification providers provide new types of notifications. In addition, the global prioritization policy can be updated to remove notification types corresponding to types of notifications that are no longer generated.

In some implementations, the global prioritization policy may be unique to each user account. In this way, the global prioritization policy can be configured to prioritize certain notifications based on one or more preferences of the user. In some implementations, the user can customize the global prioritization policy to match preferences of the user a user via the user interface. In some implementations, the database can store one or more user-specific prioritization policies corresponding to one or more user accounts. For example, the user can elect to prioritize notifications related to a first ad campaign greater than notifications related to a second ad campaign. In this way, the global prioritization policy can assign a higher priority level to notifications associated with the first ad campaign relative to notification associated with the second ad campaign. In addition, the data processing system 110 can track notifications provided to the user account to determine how the user treats the notifications. The data processing system 110 can then analyze the user's actions relating to the notifications and can adjust the global prioritization policy associated with the user account according to the user's actions. For example, the user may always dismiss a particular notification. The data processing system can identify the user's behavior and adjust the priority level of the particular opportunity to be set to a lower priority level. Similarly, if a user frequently responds to a particular type of notification, the data processing system can adjust the priority level of the particular type of notification to be set to a higher priority level. In some other implementations, the behavior of a group of users towards a notification may also be monitored to adjust the priority level of a particular notification. Moreover, the priority levels of the notifications can also be adjusted based on the user's interactions with the product, for example, by identifying the most frequently requested primary content, the least requested content, their previous interaction with notifications, amongst others.

In some implementations, the global prioritization policy may be unique to a particular type of user. In this way, the global prioritization policy can be configured to prioritize certain notifications based on the type of user. For example, one user type can be an agency that manages multiple accounts, while another type of user can be an advertiser. The agency that manages multiple accounts may be better served by viewing critical notifications associated with individual accounts or notifications that affect multiple accounts. Providing the agency with the same types of notifications for each of the accounts the agency manages can quickly lead to notification blindness, as the agency may be managing hundreds of accounts. Furthermore, there may be different types of advertisers, for example, advertisers corresponding to large businesses and advertisers that are small or medium sized businesses. As such, the global prioritization policy for different types of users may be different.

Once a priority level for each of the notifications identified to be provided for display has been determined, the data processing system provides one or more of the identified notifications for display based on a notification display policy and the priority levels of the identified notifications. In some implementations, the notification presentation module 130 can display the notifications in one or more notification slots provided for display on the user interface. In some implementations, the notification presentation module 130 provides the notifications for display concurrently with the primary content requested by the user.

The notification display policy includes one or more rules to determine a format in which the notification presentation module 130 can display a particular notification. In some implementations, the notification display policy can include one or more different notification display techniques. In some implementations, the notification presentation module 130 can be configured to display notifications having priority levels above a threshold level according to a first display technique and notifications having priority levels equal to or less than a threshold level according to a second display technique. In some implementations, the notification presentation module 130 can be configured to display notifications in more than two different display techniques. In some implementations, the number of display techniques can equal the different number of priority levels the data processing system is capable of providing according to the global prioritization policy.

In some implementations, the notification presentation module 130 can display notifications having a priority level greater than the threshold priority level using the first display technique. The first display technique allows the notification presentation module 130 to display qualifying notifications in a notification slot provided for display on the user interface.

Referring now also to FIGS. 2A-2E, example screenshots illustrating notifications provided on a user interface are shown. The user interface 200 may be displayed on a display device of the user computing device 115. Generally, each screenshot of the user interface 200 includes one or more notification slots and a primary content slot. In FIG. 2A, the user interface 200 includes a notification slot 210 in which a notification 212 is displayed. The notification 212 has a priority level above a threshold priority level to be displayed in the first notification slot 210. The notification 212 includes an object 214, which when accessed by the user, directs the user to a page where the user can resolve the cause that triggered the generation of the notification 212 in the first place. The user interface 200 also includes a primary content slot 220 that includes primary content 222 requested by the user. In this specific example, the primary content relates to "All online campaigns". Additional details of the screenshots shown in FIGS. 2A-2E will be provided to supplement a discussion of the functionality of the notification presentation module 130 shown in FIG. 1.

In some implementations, the notification slot 210 can be configured to have a threshold view limit. The threshold view limit is the maximum number of notifications that can be displayed in the notification slot at any given time. For example, if the threshold view limit is 3, no more than 3 notifications can be displayed at any given time. If the number of qualifying notifications is greater than the threshold view limit, three of the qualifying notifications can be displayed in the notification slot. In addition, an indicator indicating that additional qualifying notifications are available for display is also provided for display within the notification slot. The indicator can be configured to display the additional qualifying notifications when an action is taken on the indicator. Examples of actions can include clicking on or hovering over the indicator. In some implementations, the indicator can indicate a number of additional qualifying notifications available for display.

In some implementations in which the number of notifications having a first priority level exceeds the threshold view limit, the notification presentation module 130 can select, from the notifications having the first priority level, a number of notifications that matches the threshold view limit according to a selection policy. The notification presentation module 130 then provides the selected predetermined number of notifications for display and provides an object, which when accessed, provides the remaining notifications having the first priority level. In some implementations, the object is provided within the notification slot. In some implementations, the object can be an icon or other graphical representation. The object can be accessed by taking one or more actions, for example, clicking on or hovering over the object. The selection policy includes one or more rules to select which of the qualifying notifications are to be displayed in the notification slot and which of the qualifying notifications are to be displayed responsive to an action taken on an object. In some implementations, the selection policy may be configured to select notifications based on their priority levels, such that notifications having the highest priority levels are displayed first, that is, in the notification slot, while lower priority levels are displayed via the object. In some implementations, the selection policy may be based on when the notifications are generated such that the most recent notifications are displayed first. In some implementations, the selection policy may be based on time, priority level, user account preferences, relevance to primary content, or a combination thereof.

In some implementations, the notification slot can be a dynamic notification slot. The dynamic notification slot is configured to display notifications configured to adjust in size based on a number of unaddressed notifications. Unaddressed notifications can include notifications on which the user has not taken an action. Addressed notifications include notifications on which the user has taken an action, for example, clicked on the notification, disabled the notification, marked the notification as seen, hidden the notification, or taken an action that resolves the cause that triggered the generation of the notification in the first place.

In some implementations, the size of the notification slot can be based on the number of notifications to be displayed in the notification slot. In some implementations, the size of the notification slot can affect the size or position of the primary content slot. In some implementations, the notification slot 210 can be positioned above and adjacent to the primary content slot 220. In some implementations, a bottom edge of the first notification slot 210 can be positioned adjacent to or in contact with a top edge of the primary content slot 220. In this way, as the height of the notification slot 210, defined as the distance between the top edge and bottom edge of the notification slot changes, the corresponding height of the primary content slot 220 can also change. In some implementations, as the height of the notification slot decreases, the top edge of the primary content slot moves upwards towards a top edge of the user interface. Conversely, as the height of the notification slot 210 increases, the top edge of the primary content slot 220 moves downwards towards a bottom edge of the user interface 200.

The data processing system 110 can dynamically adjust the size of the notification slot as the number of qualifying notifications changes in the first notification slot. In some implementations, the data processing system 110 is configured to display unaddressed notifications. In this way, as the user addresses notifications, the notifications are removed from the list of qualifying notifications. In some implementations, the notifications may be addressed by either taking an action on the notification, for example, clicking on the notification or selecting an option associated with the notification. As described above, a user may address the notification by taking some other action that resolves the cause that triggered the generation of the notification in the first place. For instance, if the notification indicates that a credit card is expired, and the user takes an action of updating the credit card information stored in the user account with an unexpired credit card, the notification can be removed.

In some implementations, as long as the number of qualifying notifications in the first notification slot equals or exceeds a threshold view limit, the size of the first notification slot remains the same. This is because the number of notifications available for display in the first notification slot is still equal to or greater than the threshold view limit. However, as the number of qualifying notifications in the notification slot falls below the threshold view limit, the size of the first notification slot is reduced. As described above, in some implementations, in which the top edge of the primary content remains adjacent to and in contact with the bottom edge of the first notification slot, the primary content slot can either increase in size, remain the same size but move upwards towards a top edge of the user interface such that the top edge of the primary content slot is in contact with the bottom edge of the notification slot, or do both. As such, in some implementations, the placement of the primary content slot is responsive to the size or position of the dynamic notification slot.

As described above, the notification presentation module 130 can display notifications having a priority level equal to or below the threshold priority level according to a second display technique. In some implementations, the notification presentation module 130 provides an indication of notifications having a second priority level for display at a second location of the display. The second display technique allows the notification presentation module 130 to display qualifying notifications in a second notification slot that can be provided for display after an action is taken on an object associated with the second notification slot.

Figure 2B:
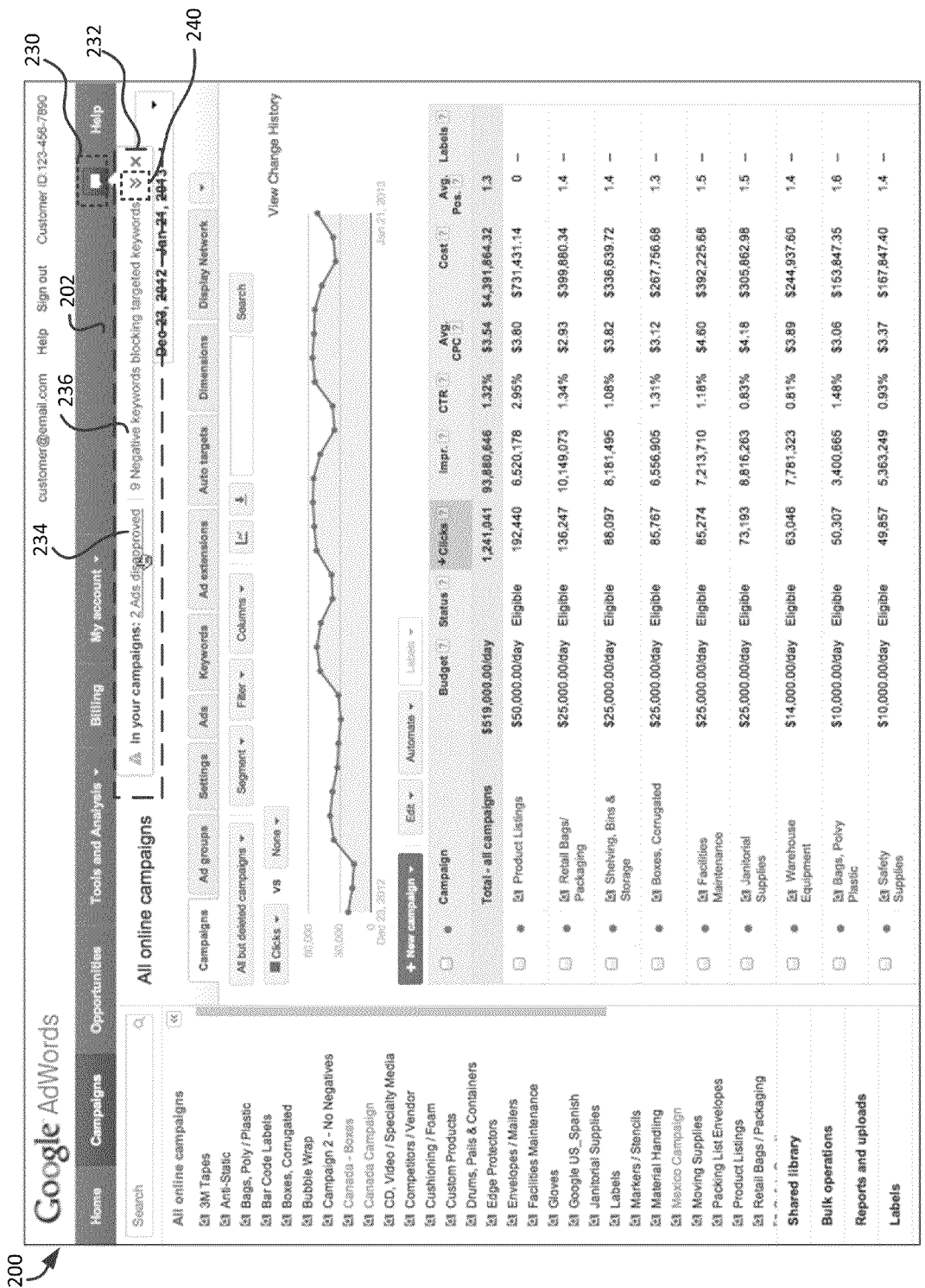

Referring now to FIG. 2B, the screenshot of the user interface 200 includes a second notification slot 232. The notification slot 232 is configured to become visible responsive to the user taking an action on an object 230 associated with the second notification slot 232. Examples of actions can including clicking on or hovering over the object. The notification slot 232 includes two objects 234 and 236 that expand the notification slot to display various notifications shown in FIG. 2C.

Figure 2C:
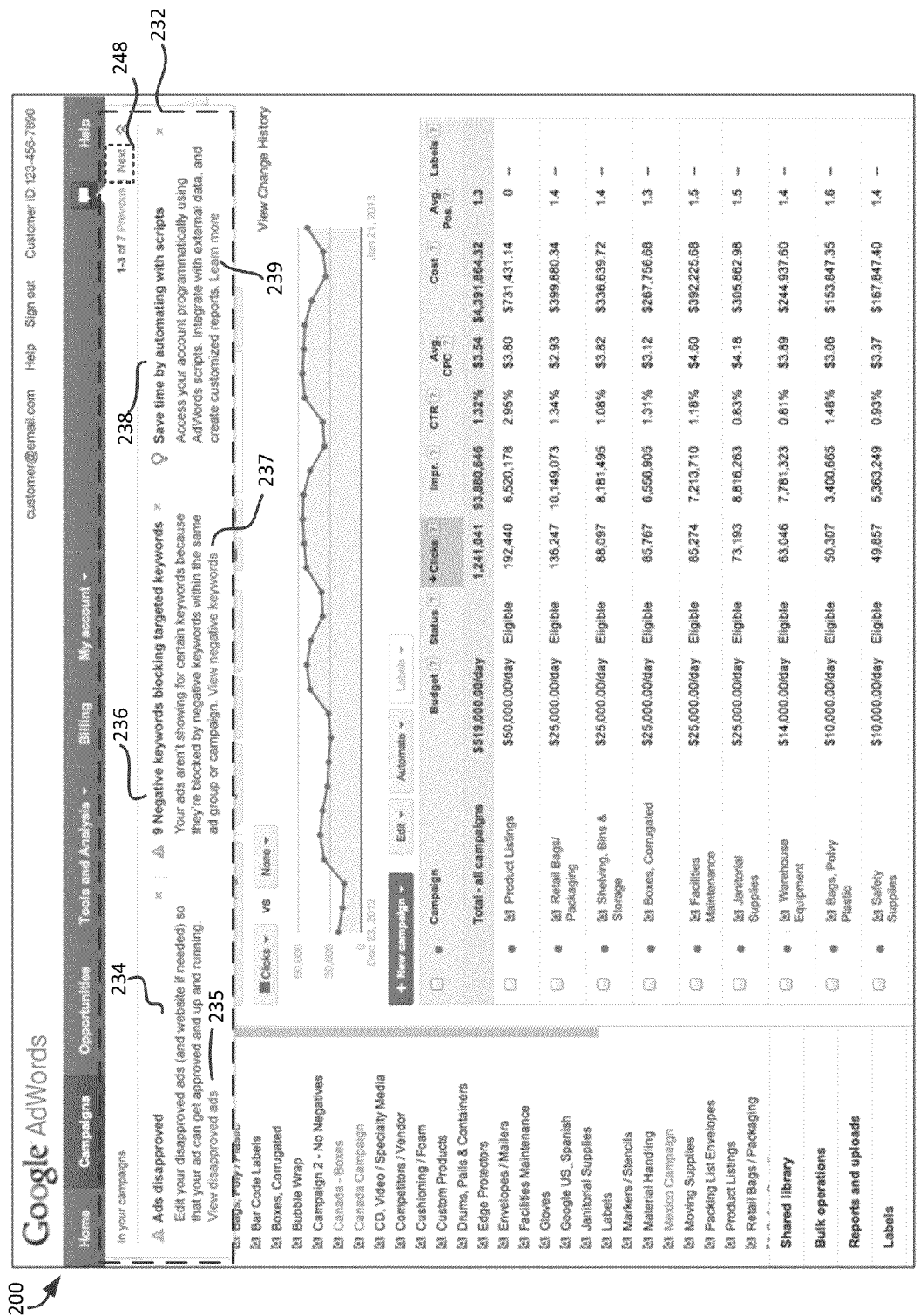

As shown in FIG. 2C, the notifications provided for display can be contextually related to the requested content. For example, the primary content displayed relates to "Campaigns". As such, one or more of the notifications relate to notifications related to ads. In particular, notification category 234 includes an object 235, which when accessed, will direct the user to a page where the user can address the notification 234. Similarly, notification 236 includes an object 237, which when accessed, will direct the user to a page where the user can address the notification 236 and notification 238 includes an object 239, which when accessed, will direct the user to a page where the user can address the notification 238.

Figure 2D:
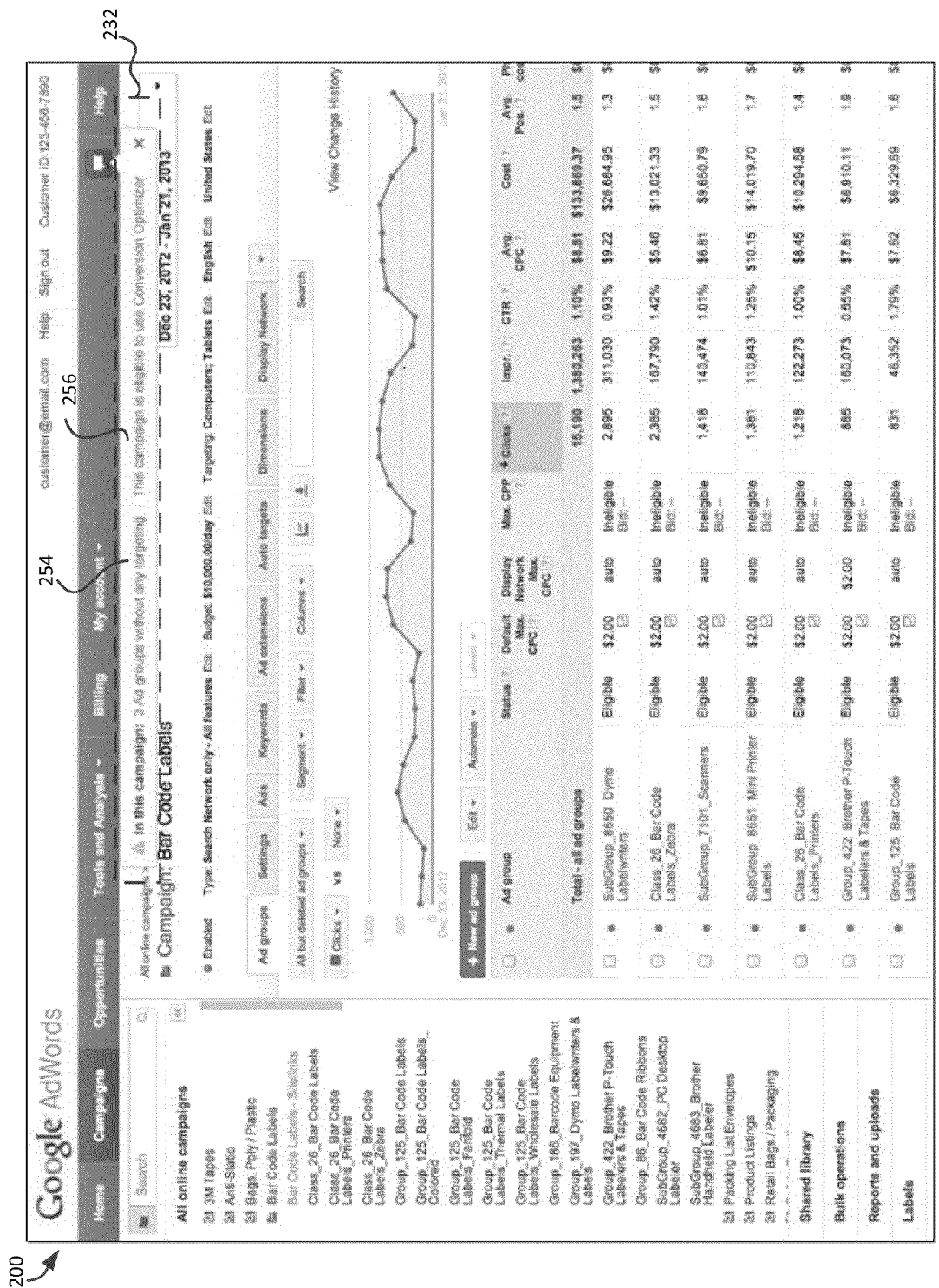
Figure 2E:

FIG. 2D shows another screenshot of the user interface. In this screenshot, the primary content is related to a specific campaign called "Bar Code Labels." As such, the notifications provided for display relate to notifications associated with this specific campaign. Specifically, notification 254 relates to ad groups within the Bar Code Labels campaign, while notifications 256 relate to a product feature that can be used with the Bar Code Labels campaign. By being able to provide contextually relevant notifications in a prioritized manner, the notification presentation system can provide notifications that are more likely to cause the user to take an action reducing the occurrence of notification blindness and providing an opportunity to improve the performance of the user and/or the product.

Referring again to FIG. 2C, In some implementations, the object 230 associated with the second notification slot 232 can be displayed at a designated location of the user interface. In some implementations, the object 230 can be displayed in a header portion 202 of the user interface 200. In some implementations, the object 230 can be displayed within the first notification slot 210 shown in FIG. 2A. In some implementations, the object 230 can be an icon indicating a number of notifications available for display. In some implementations, the location of the user interface 200 where the second notification slot is displayed 232 is different from the location of the user interface 200 where the first notification slot 210 is displayed as shown in FIG. 2A.

In some implementations, the notification presentation module 130 can arrange notifications in the second notification slot according to an arrangement policy. The arrangement policy includes one or more rules that determine how the qualifying notifications of the second notification slot are to be arranged. In some implementations, the notification presentation module 130 can arrange the notifications according to their determined priority levels. In some implementations, the notification presentation module 130 is configured to arrange the notifications by notification source, for example, billing, technology, sales, amongst others. In some implementations, the notifications can be arranged temporally such that more recently generated notifications are displayed above older notifications. In some implementations, the notifications can be displayed according to a combination of two or more of the above described arrangement schemes.

In some implementations, the size of the notification slot is limited such that a pagination feature can be implemented. Referring now again to FIG. 2C, the user interface includes object 248, which when accessed, will display additional notifications in the notification slot 232. The pagination feature allows a subset of the notifications to be displayed within the notification slot at any given time. The order in which the notifications are displayed within the notification slot 232 can be determined according to the arrangement policy.

In some implementations, the orientation and positioning of the second notification slot can vary. For example, referring now to FIG. 2E, an example screenshot of the user interface 200 includes a second notification slot 282, similar to the second notification slot 232 shown in FIG. 2C, includes notifications 284-290. In this implementation, the notification slot 282 has a vertical orientation such that the notifications are stacked vertically. In some such implementations, the notification slot 282 can have a predefined maximum vertical length. If the number of notifications to be displayed within the notification slot 282 are unable to be displayed within the notification slot 282, the notification slot may also include a scroll bar such that a user can scroll to notifications not displayed in the notification slot 282. The system can be configured to stack the notifications vertically with the notifications having the highest priority levels on top of notifications having lower priority levels. In some other implementations, the notifications may be arranged in order of recency such that newer notifications are stacked on top of older notifications. In some implementations, the notifications 284-290 can include one or more colored icons 292. In some implementations, the color of the icons 292 indicate a priority level.

Figure 3:
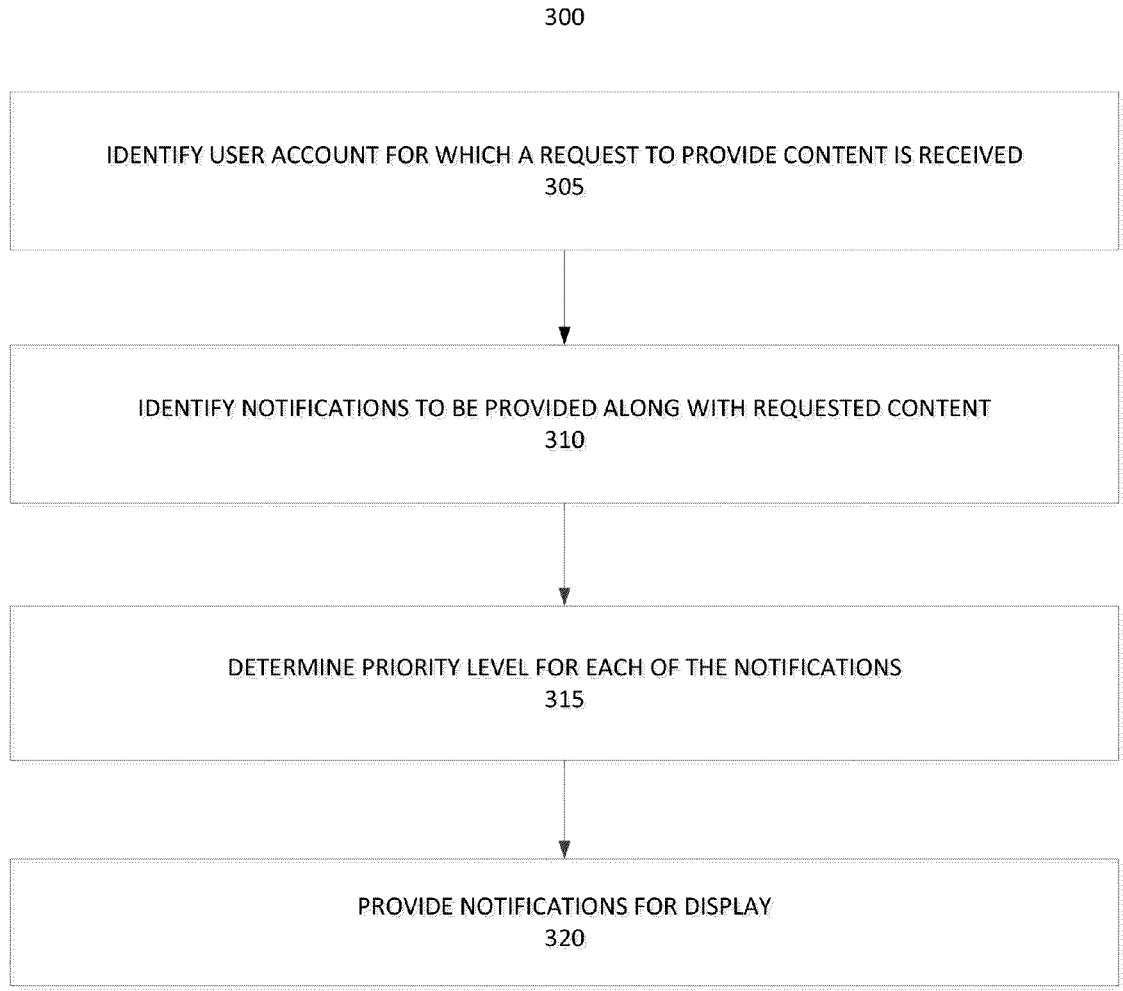
FIG. 3 is a flow diagram depicting a method for prioritized and contextual display of aggregate account notifications for display according to an illustrative implementation.

FIG. 3 illustrates an example flow diagram depicting a method 300 of providing information via a computer network. In one implementation, a data processing system identifies a user account for which a request to provide content is received (BLOCK 305). The data processing system identifies one or more notifications to be provided along with the requested content (BLOCK 310) responsive to identifying the user account and the content requested. The data processing system then determines a priority level for each of the notifications responsive to a global prioritization policy and the corresponding notification type identifier (BLOCK 315). Next, the data processing system provides one or more of the identified notifications for display based on a notification display policy and the priority levels of the identified notifications (BLOCK 320).

In further detail, the data processing system identifies a user account for which a request to provide content is received (BLOCK 305). The data processing system can identify a user account for which a request to provide content is received by identifying a user identifier associated with the request. In some implementations, the request can include a cookie or other user account identifier that uniquely identifies the user account associated with the request.

The data processing system identifies one or more notifications to be provided along with the requested content (BLOCK 310) responsive to identifying the user account and the content requested. The data processing system can identify one or more notifications to be provided along with the requested content by forwarding a request for notifications to one or more of the notification providers associated with the product associated with the request for content. For example, the product can be a PPC or advertising program. In such an example, the data processing system can send a request for notifications to each of the notification providers associated with the advertising program. In some implementations, the data processing system can identify the notification providers associated with the advertising program based on a list of notification providers maintained by the data processing system. The notification providers, upon receiving the request for notifications, can generate and/or provide one or more notifications to send to the data processing system. The request for notifications can identify the user account for which notifications are requested. Each of the notification providers can generate or retrieve one or more notifications associated with the user account and forward the notifications to the data processing system. In some implementations, the notification providers can send the notifications with one or more notification type identifiers. In some such implementations, the notification type identifiers can identify the primary entity (such as an ad, an ad campaign, a user account's ad campaigns, a billing entity, amongst others) that experiences an issue or opportunity, identify the cause that triggered the generation of the notification, identify the notification provider that provided the notification to the data processing system, identify the level of importance, identify other entities associated with the primary entity, amongst others. In some implementations, the notifications can be provided to the data processing system without the notification type identifier.

In some implementations, the data processing system identifies the notifications received from the notification providers, the notification identification module can identify one or more notifications according to a notification identification policy that includes one or more rules specifying how to identify notifications to be provided for display based on the context of the primary content or based on the level of importance of the notification to the user. In some implementations, the notification identification policy can specify which notification type identifiers are to be displayed with the primary content based on the context of the primary content. In some implementations, the notification identification policy can include a configuration file or other software construct that includes a list of all of the possible contexts associated with primary content that can be requested. The configuration file further specifies one or more notification type identifiers that match or correspond to the context. The notification identification policy also specifies notifications that may not be associated with the context of the primary content but are important or relevant to the user requesting the primary content or the product associated with the user account. In some implementations, the notification identification policy can identify notifications that have an identifier indicating a level of importance that exceeds a threshold level of importance.

In some implementations, the data processing system can maintain a database that stores notifications. The database can be configured to store notifications received from the notification providers. In some implementations, the data processing system can retrieve notifications associated with a user account from the database. In some implementations, the notifications retrieved from the database can include notification type identifiers indicating the type of notification, the entities associated with the notification, the cause that triggered the generation of the notification as well as the notification provider that generated the notification.

The data processing system determines a priority level for each of the notifications responsive to a global prioritization policy and the corresponding notification type identifier (BLOCK 315). The global prioritization policy includes one or more rules that can assign a notification a particular priority level. In some implementations, the global prioritization policy includes a list of notification types and their corresponding priority levels. In some implementations, the data processing system can determine the priority level of a notification according to the global prioritization policy by identifying one or more notification type identifiers associated with a notification to determine a priority level of the notification. Upon identifying the notification type identifiers of the notification, the data processing system can apply the global prioritization policy to identify a priority level that matches the notification type identifiers. Upon identifying a priority level that matches the notification type identifiers, the data processing system can assign the notification the identified priority level.

Next, the data processing system provides one or more of the identified notifications for display based on a notification display policy and the priority levels of the identified notifications (BLOCK 320). In some implementations, the data processing system can display the notifications in a notification slot provided for display on the user interface. In some implementations, the data processing system provides the notifications for display concurrently with the primary content requested by the user. In some implementations, the primary content is displayed in a primary content slot of the user interface.

The notification display policy includes one or more rules that determine a format in which the data processing system can display the particular notification. In some implementations, the notification display policy can include one or more different notification display techniques. In some implementations, the data processing system can be configured to display notifications having priority levels above a threshold level according to a first display technique and notifications having priority levels equal to or less than a threshold level according to a second display technique. In some implementations, the data processing system can be configured to display notifications in more than two different display techniques. In some implementations, the number of display techniques can equal the different number of priority levels the data processing system is capable of providing according to the global prioritization policy.

Figure 4:
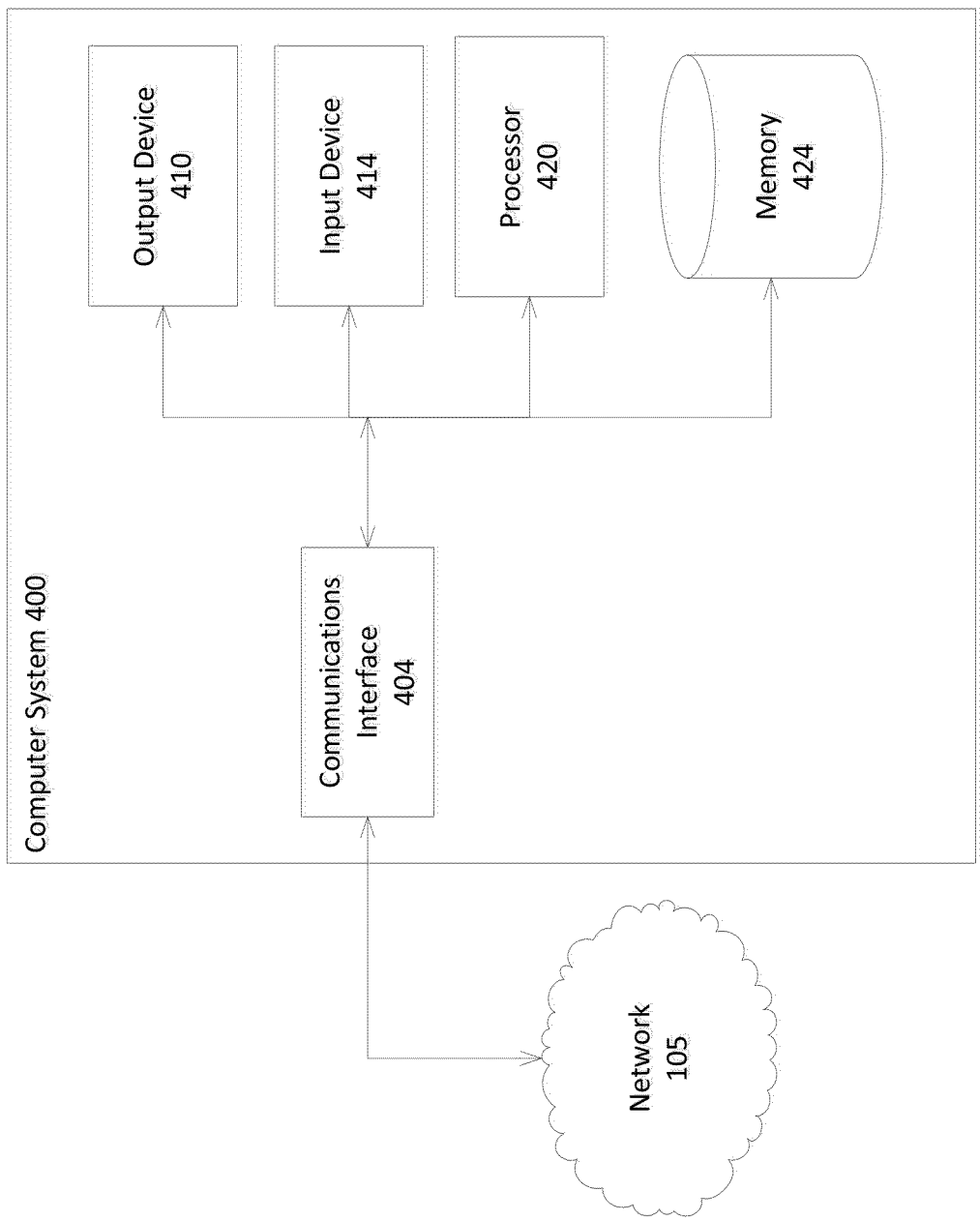
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as the notification identification module 120, the notification prioritization module 125 and the notification presentation module 130) in accordance with some implementations. The computer system 400 can be used to provide information via the network 105 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110 or the other components of the system 100 such as the notification identification module 120, the notification prioritization module 125 and the notification presentation module 130.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the notification identification module 120, the notification prioritization module 125 and the notification presentation module 130 can include the memory 425 to store computing device 115 information, related web service information, one or more notifications, one or more global prioritization policies, one or more notification display policies including one or more selection policies and arrangement policies. The memory 425 can include the database 140. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 405 include user interfaces (e.g., web pages) having primary content and notifications provided for display by the notification presentation module 130 according to a prioritization policy implemented by the notification prioritization module 125.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus" "data processing system" "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The notification identification module 120, the notification prioritization module 125 and the notification presentation module 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the notification identification module 120, the notification prioritization module 125 and the notification presentation module 130 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same embodiment. Any implementation or embodiment may be combined with any other embodiment, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the notifications can be associated with any program capable of generating and providing notifications for display. Although the examples provided herein relate to an advertising program, the systems and methods described herein can be applied to any program in any vertical in which notifications generated by a plurality of different notification generation systems are provided for display on a single user interface. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for providing notifications, comprising:
   receiving, by one or more processors, a request for content specific to a user account;
   identifying the user account for which the request to provide content is received;
   identifying, from the request for content, a content type of the content;
   identifying a set of notifications to be provided along with the requested content responsive to identifying the user account and the content type requested, each of the notifications in the set having a corresponding notification type identifier indicating a type of notification;
   applying, to each of the notifications in the set of notifications, a global prioritization policy to determine a priority level of each notification based on a respective notification type of each notification;
   determining the priority level for each of the notifications based on the global prioritization policy and the corresponding notification type identifier;
   selecting, from the set of notifications, a subset of notifications to display based on the determined priority levels of each notification in the subset of notifications; and providing, for display, the selected subset of notifications based on a notification display policy and the determined priority levels of the selected subset of notifications, wherein the selected subset of notifications are provided for display in a dynamic notification slot, the dynamic notification slot configured to adjust in size based on a number of unaddressed notifications;

wherein the global prioritization policy includes one or more rules for assigning priority levels to notifications, and the notification display policy includes one or more rules for formatting display of notifications based on respective priority levels of notifications to be displayed.

2. The method of claim 1, wherein identifying the set of notifications comprises identifying a first notification corresponding to the identified user account generated by a first notification generation system and identifying a second notification corresponding to the requested content generated by a second notification generation system.

3. The method of claim 1, wherein determining the priority level for each of the notifications based on the global prioritization policy and the corresponding notification type identifier comprises:
   identifying, for each notification, the notification type identifier;
   identifying a corresponding priority level that matches the notification type identifier; and
   assigning, to the notification, the identified corresponding priority level.

4. The method of claim 1, wherein providing, for display, the selected subset of notifications based on a notification display policy and the determined priority levels of the selected subset of notifications comprises:
   determining a format in which to display the identified notification based on the determined priority level; and
   providing the identified notification for display in the determined format.

5. The method of claim 1, wherein providing, for display, the selected subset of notifications based on a notification display policy and the determined priority levels of the selected subset of notifications comprises:
   determining that the number of notifications having a first priority level is greater than a predetermined threshold number of notifications to display with the requested content;
   selecting, from the notifications having the first priority level, the predetermined number of notifications according to a selection policy;
   providing the selected predetermined number of notifications for display with the requested content; and
   providing an object, which when accessed, provides the remaining notifications having the first priority level.

6. The method of claim 1, wherein providing, for display, the selected subset of notifications comprises providing notifications having a first priority level for display at a first location of the display.

7. The method of claim 6, wherein providing, for display, the selected subset of notifications further comprises providing an indication of notifications having a second priority level for display at a second location of the display.

8. The method of claim 1, wherein the requested content is provided for display in a primary content slot.

9. The method of claim 8, wherein the placement of the primary content slot is responsive to the size of the dynamic notification slot.

10. A system for providing notifications, the system comprising:
   a data processing system comprising at least one computer processor, the data processing system configured to:
   receive a request for content specific to a user account;
   identify the user account for which the request to provide content is received;
   identify, from the request for content, a content type of the content;
   identify a set of notifications to be provided along with the requested content responsive to identifying the user account and the content type requested, each of the notifications in the set having a corresponding notification type identifier indicating a type of notification;
   apply, to each of the notifications in the set of notifications, a global prioritization policy to determine a priority level of each notification based on a respective notification type of each notification;
   determine the priority level for each of the notifications based on the global prioritization policy and the corresponding notification type identifier;
   select, from the set of notifications, a subset of notifications to display based on the determined priority levels of each notification in the subset of notifications; and
   provide for display, the selected subset of notifications based on a notification display policy and the determined priority levels of the selected subset of notifications, wherein the selected subset of notifications are provided for display in a dynamic notification slot, the dynamic notification slot configured to adjust in size based on a number of unaddressed notifications;
   wherein the global prioritization policy includes one or more rules for assigning priority levels to notifications, and the notification display policy includes one or more rules for formatting display of notifications based on respective priority levels of notifications to be displayed.

11. The system of claim 10, wherein the set of notifications comprises a first notification corresponding to the identified user account generated by a first notification generation system and a second notification corresponding to the requested content generated by a second notification generation system.

12. The system of claim 10, wherein the data processing system is configured to:
   identify, for each notification, the notification type identifier;
   identify a corresponding priority level that matches the notification type identifier; and
   assign, to the notification the identified corresponding priority level.

13. The system of claim 10, wherein the data processing system is further configured to:
   determine a format in which to display the identified notification based on the determined priority level; and
   provide the identified notification for display in the determined format.

14. The system of claim 10, wherein the data processing system is further configured to:
   determine that the number of notifications having a first priority level is greater than a predetermined threshold number of notifications to display with the requested content;
   select, from the notifications having the first priority level, the predetermined number of notifications according to a selection policy;
   provide the selected predetermined number of notifications for display with the requested content; and
   provide an object, which when accessed, provides the remaining notifications having the first priority level.

15. The system of claim 10, wherein the dynamic notification slot includes a first notification slot and a second notification slot, and notifications having a first priority level are displayed in the first notification slot positioned at a first location of the display and notifications having a second priority level are displayed in the second notification slot positioned at a second location of the display.

16. The system of claim 15, wherein the global prioritization policy is customized by the user according to one or more preferences of the user.

17. A non-transitory computer readable storage medium having instructions to provide information via a computer network, the instructions comprising instructions to:
receive a request for content specific to a user account;
identify the user account for which the request to provide content is received;
identify, from the request for content, a content type of the content;
identify a set of notifications to be provided along with the requested content responsive to identifying the user account and the content type requested, each of the notifications in the set having a corresponding notification type identifier indicating a type of notification;
apply, to each of the notifications in the set of notifications, a global prioritization policy to determine a priority level of each notification based on a respective notification type of each notification;
determine the priority level for each of the notifications based on the global prioritization policy and the corresponding notification type identifier;
select, from the set of notifications, a subset of notifications to display based on the determined priority levels of each notification in the subset of notifications; and
provide for display, the selected subset of notifications based on a notification display policy and the determined priority levels of the selected subset of notifications, wherein the selected subset of notifications are provided for display in a dynamic notification slot, the dynamic notification slot configured to adjust in size based on a number of unaddressed notifications;
wherein the global prioritization policy includes one or more rules for assigning priority levels to notifications, and the notification display policy includes one or more rules for formatting display of notifications based on respective priority levels of notifications to be displayed.

18. The non-transitory computer-readable storage medium of claim 17, further comprising instructions to identify a first notification corresponding to the identified user account generated by a first notification generation system and identify a second notification corresponding to the requested content generated by a second notification generation system.

19. The non-transitory computer-readable storage medium of claim 17, further comprising instructions to:
identify, for each notification, the notification type identifier;
identify a corresponding priority level that matches the notification type identifier; and
assign, to the notification, the identified corresponding priority level.

20. The non-transitory computer-readable storage medium of claim 17, further comprising instructions to:
determine a format in which to display the identified notification based on the determined priority level; and
provide the identified notification for display in the determined format.

21. The system of claim 10, wherein the data processing system is configured to provide the requested content for display in a primary content slot, wherein placement of the primary content slot is responsive to the size of the dynamic notification slot.

22. The non-transitory computer-readable storage medium of claim 17, further comprising instructions to provide the requested content for display in a primary content slot, wherein placement of the primary content slot is responsive to the size of the dynamic notification slot.

23. The non-transitory computer-readable storage medium of claim 17,
wherein the dynamic notification slot includes a first notification slot positioned at a first location of the display and a second notification slot positioned at a second location of the display, and
wherein the instructions to provide the selected subset of notifications for display include instructions to:
provide notifications having a first priority level for displayed in the first notification slot, and
provide notifications having a second priority level for display in the second notification slot.

* * * * *